Nov. 8, 1955     H. E. ALTGELT     2,722,877
RELEASABLE PLOW STANDARD
Filed Jan. 2, 1952     3 Sheets-Sheet 1
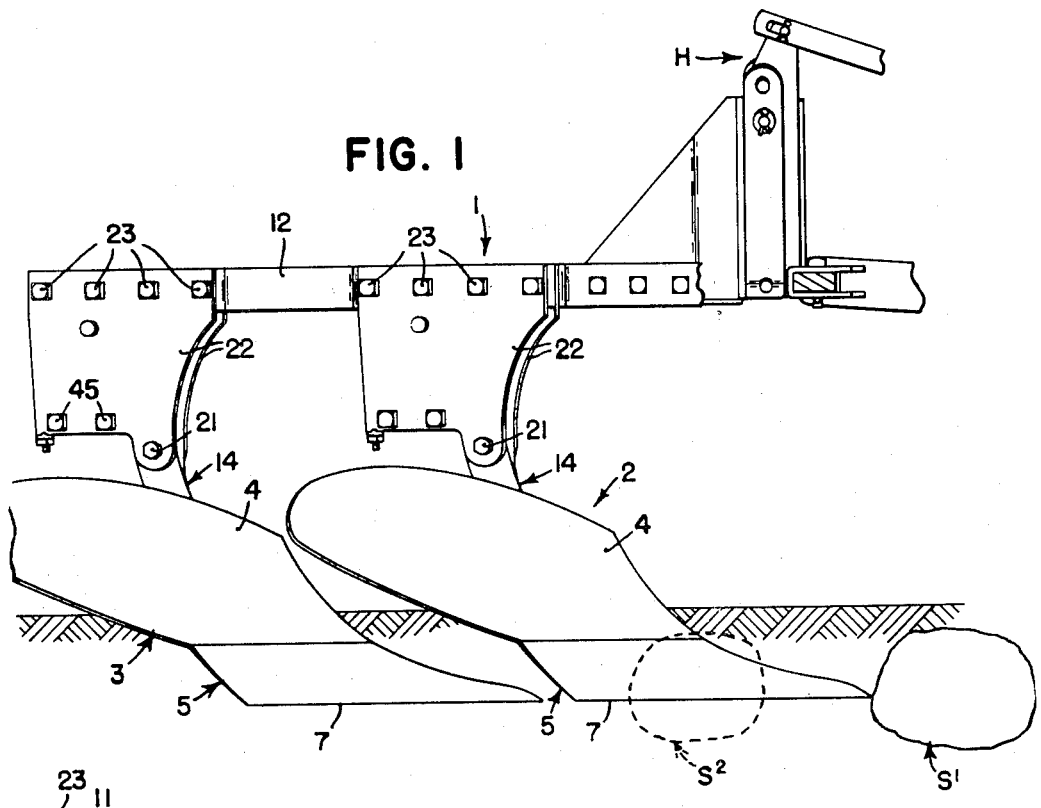
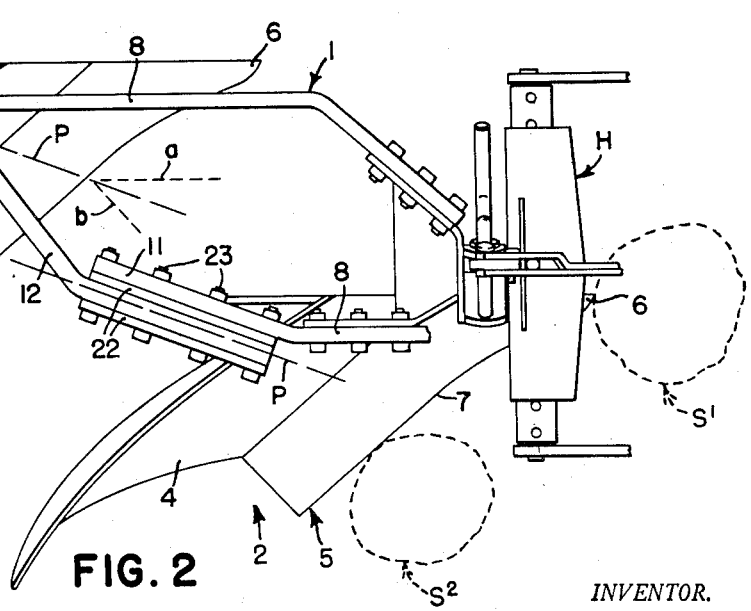
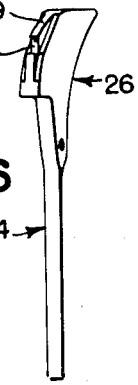
INVENTOR.
HERMAN E. ALTGELT
ATTORNEYS Nov. 8, 1955   H. E. ALTGELT   2,722,877
RELEASABLE PLOW STANDARD
Filed Jan. 2, 1952   3 Sheets-Sheet 2
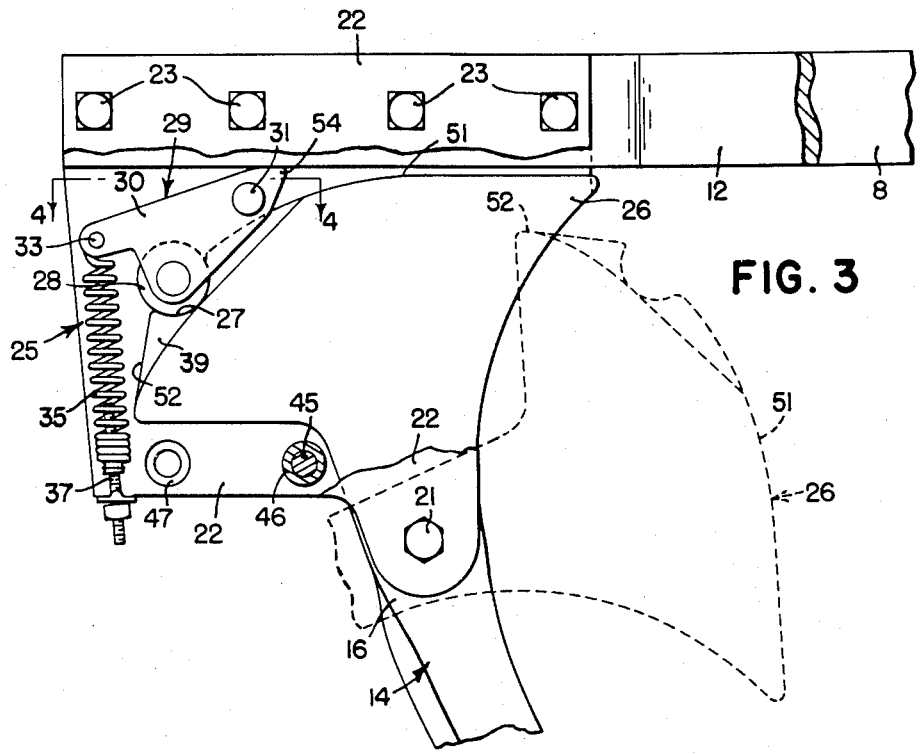
FIG. 3
FIG. 4
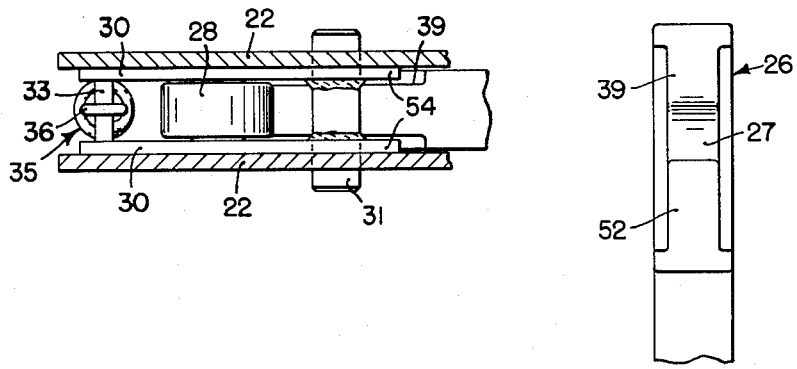
FIG. 5
INVENTOR.
HERMAN E. ALTGELT
ATTORNEYS Nov. 8, 1955  H. E. ALTGELT  2,722,877
RELEASABLE PLOW STANDARD
Filed Jan. 2, 1952  3 Sheets-Sheet 3

INVENTOR.
HERMAN E. ALTGELT
BY
*C. T. Parker & R. C. Johnson*
ATTORNEYS

United States Patent Office 2,722,877
Patented Nov. 8, 1955

2,722,877

RELEASABLE PLOW STANDARD

Herman E. Altgelt, Moline, Ill., assignor to Deere & Company, Moline, Ill., a corporation of Illinois Application January 2, 1952, Serial No. 264,480

8 Claims. (Cl. 97—47.89)

This application is a continuation-in-part of my copending application, Serial No. 183,016, filed September 2, 1950.

The present invention relates generally to agricultural implements and more particularly to ground-working implements having tool means operating below the surface of the ground, such as plows, which may be damaged by continued forward travel of the outfit after one of the tool units encounters an obstruction, such as a large stone, stump or root, or the like.

The object and general nature of the present invention is the provision of an agricultural machine having overload release means so constructed and arranged that the overload responsive means will automatically release when the tool strikes an obstruction or the like. Particularly, it is a feature of this invention to provide an agricultural machine having overload release means so constructed and arranged that the overload responsive means will automatically release, irrespective of whether or not the tool strikes an obstruction head-on or at one side. More particularly, it is a feature of this invention to provide overload release means particularly adapted for plows, in which the overload release means is constructed and arranged to have a plane of operation which extends at an angle to the line of advance, whereby a plow bottom is automatically released, even though the obstruction encountered comes into contact with a rearwardly and forwardly angled share, rather than meeting the plow point directly in the line of advance of the latter. More specifically, it is a feature of this invention to provide a pivotal connection between the plow bottom and its associated plow beam, so constructed and arranged that, acting in conjunction with a spring trip device or the like, the plow bottom is movable relative to the plow beam in a direction that extends at an angle to the line of advance, the angle being such that the plane of movement of the plow bottom extends rearwardly and landwardly, whereby the spring trip is freely operable to protect the plow bottom, irrespective of whether the obstruction encountered lies directly ahead of the plow point or engages the rearwardly and furrowwardly angled forward edge of the plowshare.

An additional feature of this invention is the provision of an automatic retaining latch cooperating with the overload release means for holding the latter, after a release, as by an overload, in a position facilitating the return of the tool means to its normal working position.

These and other objects and advantages of the present invention will be apparent to those skilled in the art after a consideration of the following detailed description of the preferred embodiment of this invention, taken in conjunction with the accompanying drawings, in which:

Figures 1 and 2 are side and plan views, respectively, of a two-bottom, tractor-mounted plow in which the principles of the present invention have been incorporated.

Figure 3 is an enlarged fragmentary detail view showing the overload responsive spring trip device, Figure 3 corresponding generally to a view taken along the line 3—3 of Figure 2, with such parts broken away.

Figure 4 is a sectional view taken along the line 4—4 of Figure 3.

Figure 5 is a rear view, looking forwardly, of the cam section at the upper end of a standard which connects each plow bottom to the associated beams of the plow frame.

Figure 6 is a detail view of one of the standards.

Figure 7:
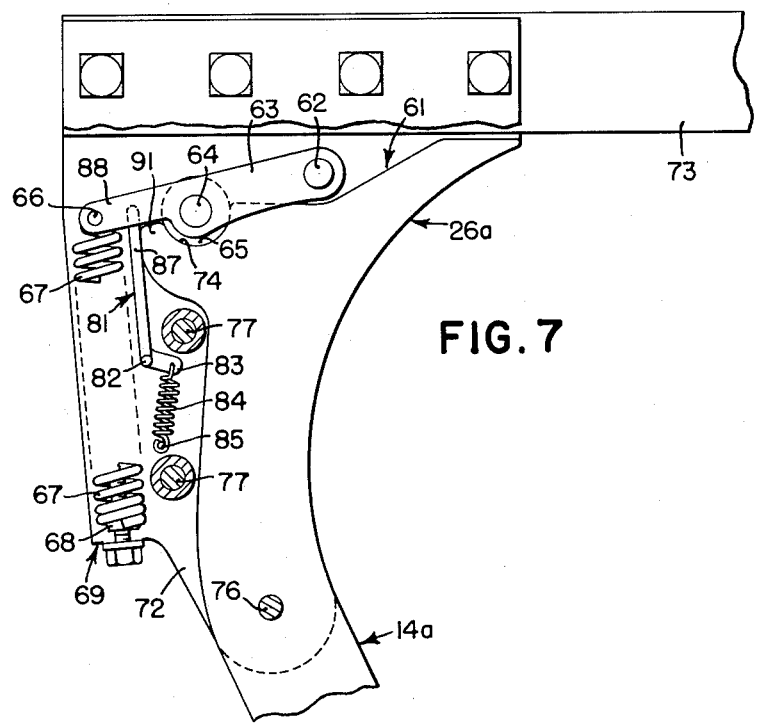
Figure 7 is a view similar to Figure 3, showing a modified form of the present invention, in which a retainer is provided for holding the overload release in a position facilitating a return of the tool to an operating position.

The present invention is incorporated in a two-bottom plow of the tractor-carried type, in which the tractor carries suitable hitch means H for receiving a plow frame to which the plow bottoms 2 and 3 are rigidly connected. The plow bottoms 2 and 3 are of the moldboard type and are identical, for all practical purposes, each including a moldboard 4 and a plowshare 5 having a forwardly extending plow point 6 and a generally rearwardly and forwardly extending cutting edge 7. Each plow bottom is mounted on a generally fore-and-aft extending plow beam 8 which, as best shown in Figure 1, is rigidly connected by a suitable clamping bracket 9 to the frame 1. Each tool beam 8 at its rear end is bent so as to extend rearwardly and landwardly, as indicated at 11, for a purpose which will appear later, and a rear brace 12 connects the rear ends of the beams 8 and forms a rigid part of the frame.

Each of the plow bottoms 2 and 3 is fixed, as by a plurality of bolts or the like, to the lower end of a generally vertically extending plow standard 14. As best shown in Figure 7, the lower end, which is indicated at 13, of each plow standard 14 lies in a generally fore-and-aft extending vertical plane but the upper end, indicated at 16, is bent or twisted so that it lies at the same angle, relative to a vertical fore-and-aft extending plane, as the rear bent portion 11 of the associated plow beam 8. Each plow standard 14 is pivotally connected to the rear bent end 11 of the associated plow beam 8 by means of a pivot member 21 carried by the lower portions of a pair of vertically disposed bracket plates 22, the upper portions of which are rigidly secured, as by bolts 23, to the rear portion 11 of the associated plow beam. The plates 22 form the principal portions of the clamping bracket 9, mentioned above. The brackets 22 are preferably in the form of flat plates and the pivot bolt 21 lies perpendicular thereto, which constrains the associated plow standard 14 for pivotal movement relative to the plow beam in a plane P that extends rearwardly and landwardly, as shown in Figure 2, at an angle to the line of advance, the direction of which is generally the same as the fore-and-aft extending portion of the associated portion of the associated plow beam 8.

Overload release mechanism of the spring trip type is connected between each plow bottom standard 14 and the associated plow beam 8 so as to hold the associated plow bottom in normal operating position at all times, except when excessive loads are encountered, as when the plow bottom strikes an obstruction. While any suitable overload release mechanism may be employed in the broader applications of the present invention, the form shown in the drawings is preferred. Each release mechanism is indicated in its entirety by the reference numeral 25 and comprises a cam section 26 formed on the upper portion 16 of the plow bottom standard 14. The forward portion of each cam section 26 is formed with an upwardly facing notch 27 in which a roller 28, carried on an arm 29, is journalled. The arm or lever 29 is made up of two plates 30 welded or otherwise fixed to a pin or stud 31 by which the arm 29 is pivotally connected at its front end to the plates 22. At its rear end, the arm 29 carries a pin 33 to which the upper end of a relatively heavy tension spring 35 is connected, as at 36. The lower end of the spring 35 is threaded onto the upper end of an adjusting screw-threaded rod member 37 which is slidably connected at its lower end with a trunnion member 38 that is rockably received in notches formed in the lower rear portions of the two bracket plates 22. It will be seen, particularly from Figures 3, 4 and 6, that the notch 27 is formed in a narrowed portion 39 of the cam member 26, which narrowed portion is dimensioned to fit in between the two lever plates 30. Otherwise, the cam member 26 occupies substantially all of the space between the bracket plates 22, and being of appreciable extent, as indicated in Figure 3, the upper part of the cam section 26 transmit twisting forces, imposed by the plow bottom on the standard 14, substantially directly to the plow frame through the upper portions of the plates 22, the upper portions of the cam section 26 lying substantially at or immediately adjacent the frame bars 8 and 12.

As best shown in Figure 3, the pivot 21 by which the plow standard 14 is pivotally connected with the bracket structure 22, 22 extends through the lower portions of the plates 22 and, as disclosed and claimed in the parent application, includes means that rigidly interconnects the two plates 22, when the bolt 21 is tightened, with sufficient clearance between the cam section 26 and the bracket plates 22 to accommodate relatively free movement of the plow standard 14 about the bolt 21 and bushing 41 as a pivot. A pair of bolt means 45 is used to connect the lower rear portions of the plates 22, whereby when the bolts 45 are tightened the bracket plates 22 are rigidly connected together. The bushing of the bolt means 45 is indicated by the reference numeral 46, and in the lefthand portion of Figure 3, the bushing 46 and associated parts are omitted in order to show the socket 47 which is formed in each plate 22 to receive the associated bushing 46.

The spring 35 is of sufficient strength to hold the roller 28 seated in the notch 27 in the cam section 26 under all normal loads, but if the plow bottom is subjected to an abnormal loading, as by striking a stone or the like, the roller 28 is forced out of the notch 27, whereupon the plow bottom standard 14 swings about the pivot 21 in the generally vertical plane P to permit the plow bottom to swing over and clear the obstruction. During this action, the roller 28 rides along the upper surface 51 of the cam section 26 and down along the rear side 52 thereof, effectively holding the plow bottom in its tripped position until backing the outfit serves to restore the plow bottom to its normal position. The arm plates 30 have forward extensions 54 which, as shown in Figure 3, are arranged to contact the adjacent portion on the associated plow frame member 12 so as to serve as a stop limiting the downward swinging of the arm 29 in the tripped position of the plow standard 14, shown in dotted lines in Figure 3. This prevents the roller 28 from getting hooked behind the cam member 26 which, if permitted to occur, might prevent the restoration of the plow bottom to its operating or plowing position.

It is an essential feature of the present invention to so arrange the parts that in responding to an overload, the plow bottom will swing rearwardly about an axis that is not perpendicular to the line of advance, or to the generally fore-and-aft extending plow beam, but about an axis which is disposed at such an angle that the plane of movement of the plow bottom, represented by the line P in Figure 2, extends forwardly and furrowwardly so that it lies generally midway between a fore-and-aft extending direction, as represented by the line $a$ in Figure 2, and a line $b$ that is perpendicular to the cutting edge 7 of the plowshare. Expressed in another way, the axis of pivoting of each overload release controlled plow beam is, according to the present invention, arranged to extend in a line that lies generally midway between a line perpendicular to the line of advance, and the line of the cutting edge 7 of the plowshare.

The particular advantage of this arrangement is that the overload release unit 25 is positioned so as to respond practically instantaneously to an overload condition, whether the overload be caused by encountering an obstruction, such as a heavy stone or the like, immediately in front of the plow point, as represented by the imbedded stone $S^1$, or by encountering an obstruction, such as a stone $S^2$ somewhere along the rearwardly and furrowwardly angled cutting edge of the plowshare 5. Due to the work of the latter, the plowshare encounters obstructions and the like along its cutting edge many times more often than an obstruction is encountered directly ahead of the plow point 6. Therefore, in arranging the plane P of action of the pivotal support of the plow bottom somewhere generally midway between the fore-and-aft extending line and a line perpendicular to the plowshare edge 7, the overload trip mechanism is arranged to respond to practically any condition arising from the plow striking an obstruction.

It will be noted that each of the plow bottoms 2 and 3 is connected to the associated plow beam by means of overload trip mechanism arranged as described above. Generally speaking, the problem of encountering obstructions is much more serious in a multi-bottom plow, than in the single-bottom plow. In the latter case, if the plow bottom strikes a stone or the like somewhere along the forward edge of the furrow, generally at one side of the plow point, the entire plow can more or less readily shift laterally to pass around the obstruction. However, in the case of heavier plows employing two or more bottoms, it is generally more likely that the plow bottom connections will be sprung before the entire plow will shift to one side to permit the plow bottom to pass the obstruction.

Figure 8:
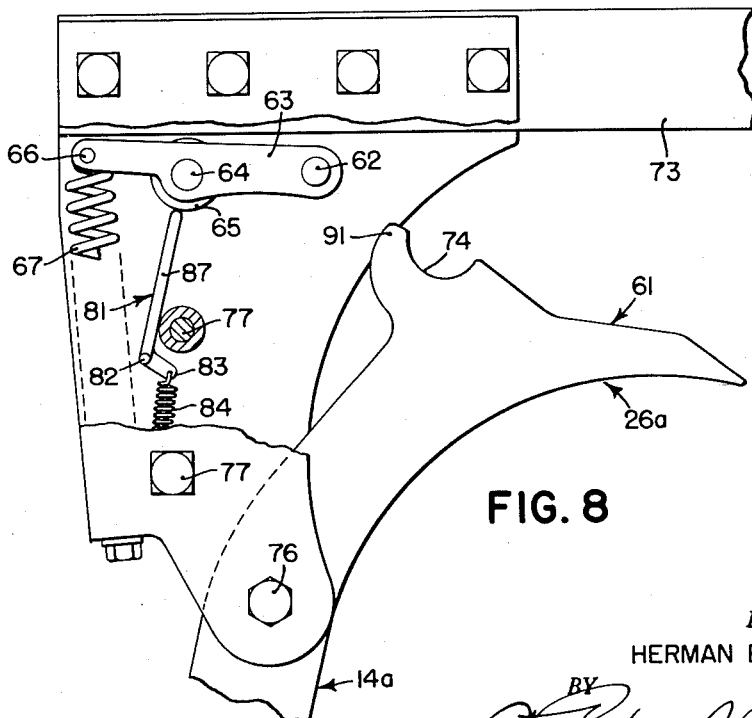
Figure 8 is a fragmentary view, similar to Figure 7, showing the retaining latch holding the overload release means in its tripped position.

In the modified form of the present invention shown in Figures 7 and 8 the plow standard 14a has its upper cam section 26a reduced in vertical dimension, as indicated at 61, to provide space for a pivot 62 on which the forward end of an arm 63, which is quite similar to the arm 29, is pivoted. The arm 63 carries a short pin 64 on which a roller 65 is journaled, and the rear end of the arm 63 carries a pin 66 to which the upper end of a tension spring 67 is connected. The lower end of the spring 67 is connected through an adjusting nut 68 with a shoulder 69 formed on the two bracket plates 72 that connect the plow standard 14a with the associated plow beam 73. Like the construction shown in Figures 1–3 and described above, the upper portion of the plow standard 14a fits snugly between the upper portions of the bracket plates 72 whereby any twisting strains imposed on the plow standard 14a are transmitted substantially directly to the plow beam 73.

The roller 65 on the arm 63 normally lies in a notch 74 formed in the upper portion of the cam section 26a, and the construction is such that the spring 67 normally holds the roller 65 in the notch 74 against all normal stresses. If, however, the plow bottom fixed to the standard 14a should encounter an obstruction or the like, the roller 65 is forced upwardly out of the notch 74 and the plow standard 14a is permitted to rotate about the pin 76 that pivotally connects the standard with the lower portions of the bracket 72. The latter is held in properly spaced apart relation by bolt and bushing means 77.

When the upper portion of the standard 14a is forced forwardly, raising the roller 65 out of the notch and rocking the arm 63 upwardly against the relatively strong force exerted by the spring 67, means is provided, according to the principles of the present invention, that prevents the roller and arm from moving downwardly when the upper portion 26a of the plow standard 14a is swung forwardly out of contact with the roller 65. Such means will now be described.

A retaining latch in the form of a bell crank 81 is pivotally mounted, as by trunnions 82 or the like carried in openings formed in the bracket plates 72. The latch 81 is formed at its lower end with a short arm 83 to which the upper end of a spring 84 is connected. The lower end of the spring 84 is anchored to a pin 85 carried on one of the bracket plates 72. The other end of the latch 81 is extended upwardly, as indicated at 87, and is formed so as to lie between the two sections 88 and 89 of the rear end of the arm 63. When the arm 63 is forced upwardly by the roller 65 moving out of the notch 74, the spring 84 causes the upper end 87 of the latch to follow the forward movement of the plow standard and thus move into a position underneath the roller 65, the latch arm 87 being prevented from moving farther than this position by its contact with the bushing on the upper connecting bolt 77. As will be seen from Figure 7, this position is such that the upper end of the latch arm 87 lies forward of a line joining the center of the pivot 82 with the center of the pin 64, on which the roller 65 is mounted, when the arm 63 is in its uppermost position. There is, therefore, a component of force which serves to hold the latch arm 87 in its locking position until the return of the plow standard 14a to its normal position brings the rear section 91 of the upper end against the forward face of the arm 87, whereupon further restoring movement of the plow standard will force the latch arm 87 rearwardly, thus permitting the roller 65 to re-enter the notch 74. By virtue of this latch construction, it is unnecessary, during the restoring movement of the plow back to its normal position after having been tripped, to work against the spring 67.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a plow, a plow bottom of the moldboard type having a landside and a share the forward edge of which extends generally rearwardly and furrowwardly from the point of the share at an angle to the landside, a plow beam extending generally parallel to the landside and having its rear end bent so as to be disposed in a vertical plane that extends rearwardly and landwardly, downwardly extending brackets fixed to said rear beam portion, a standard having a lower end to which said plow bottom is fixed, means pivotally connecting the upper end portion of said plow standard to said brackets, with the latter on opposite sides of said standard, so that said standard and plow bottom are adapted to swing generally rearwardly and upwardly in a direction generally parallel to said vertical plane, and overload release means connected to act between said standard and beam to yieldably resist swinging of said standard about said axis.

2. In a plow, a plow frame including a beam, a pair of brackets rigidly connected at their upper portions to said beam and extending downwardly therefrom in laterally spaced apart relation, a plow standard pivotally connected at an intermediate portion with the lower portions of said brackets and having an upper section lying between said brackets, a spring-biased member lying between the upper portions of said brackets and having a portion releasably engaged with the upper portion of said plow standard, a retaining latch pivotally mounted between said brackets and disposed in a position to engage said portion of the spring-biased member when the plow standard is released from said spring-biased member, and spring means acting against said retaining latch for urging the latter to move into a position holding said spring-biased member against movement when the plow standard is released from said spring-biased member.

3. In a plow, a plow frame including a beam, a pair of brackets rigidly connected at their upper portions to said beam and extending downwardly therefrom in laterally spaced apart relation, a plow standard pivotally connected for fore-and-aft swinging with the lower portions of said brackets and having an upper portion disposable between said brackets, said upper portion having a notch therein, a spring-biased member pivotally connected with said brackets and carrying a roller engageable in said notch for yieldably holding said plow standard against movement between said brackets, said plow standard being forced away from said roller upon the occurrence of an overload, and means disposable between said brackets and responsive to movement of said plow standard away from said roller for engaging the latter so as to hold the roller in a position facilitating re-engagement of the notch of said plow standard with said roller upon restoring movement of said plow standard.

4. The invention set forth in claim 3, further characterized by said responsive means including a pivoted latch biased for movement into a position in which the latch has a portion underlying said roller, and means for limiting the movement of said latch so as to dispose said portion in an overcenter position with respect to its pivot axis and the axis of said roller.

5. The invention set forth in claim 4, further characterized by means on said standard engageable with said latch for forcing the latter away from said roller upon the occurrence of a restoring movement of said plow standard, thereby facilitating re-entry of said roller into the notch of said standard.

6. In a plow, a plow frame, a plow standard pivotally connected with said frame for generally fore-and-aft swinging, with the upper portion disposable adjacent said frame, said upper portion having a notch therein, a spring-biased member pivotally connected with said frame and carrying a roller engageable in said notch for yieldably holding said plow standard against movement relative to said frame, said plow standard being forced away from said roller upon the occurrence of an overload, and means carried by said frame and responsive to movement of said plow standard away from said roller for engaging the latter so as to hold the roller in a position facilitating re-engagement of the notch of said plow standard with said roller upon restoring movement of said plow standard.

7. In a plow, a plow frame including a beam, a pair of brackets rigidly connected at their upper portions to said beam and extending downwardly therefrom in laterally spaced apart relation, a plow standard pivotally connected at an intermediate portion with the lower portions of said brackets and having an upper section lying between said brackets, there being a notch formed in the rear portion of said upper section, a spring-biased member lying between the upper portions of said brackets and including two spaced apart members pivotally connected at their forward ends with said brackets and extending rearwardly generally beyond said upper standard section, a notch-engaging member carried by said spaced apart members between the ends of the latter and adapted to engage in the notch in the rear portion of said standard section, and a generally vertically arranged tension spring member connected at its upper end with the rear portion of said spring-biased member and adjustably connected at its lower end with the lower rear portions of said brackets.

8. The invention set forth in claim 7, further characterized by a retaining member disposed between said biasing spring and the rear portion of said upper standard section for releasably retaining said spring-biased member in a standard-releasing position.

(References on following page)

References Cited in the file of this patent

UNITED STATES PATENTS

| | | |
|---|---|---|
| 554,892 | McFall | Feb. 18, 1896 |
| 693,882 | Morrison | Feb. 25, 1902 |
| 737,167 | Smith | Aug. 25, 1903 |
| 1,078,871 | Olson | Nov. 18, 1913 |
| 1,253,961 | Grimsrud | Jan. 15, 1918 |
| 1,808,478 | Printz | June 2, 1931 |
| 2,552,292 | Metz et al. | May 8, 1951 |

FOREIGN PATENTS

| | | |
|---|---|---|
| 313,139 | Germany | July 5, 1919 |
| 441,958 | Germany | Mar. 17, 1927 |